United States Patent
Hirahara

(10) Patent No.: US 6,975,605 B2
(45) Date of Patent: Dec. 13, 2005

(54) RADIO COMMUNICATION SYSTEM

(75) Inventor: Yoshimi Hirahara, Narashino (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 927 days.

(21) Appl. No.: 09/726,451

(22) Filed: Dec. 1, 2000

(65) Prior Publication Data

US 2001/0004597 A1  Jun. 21, 2001

(Under 37 CFR 1.47)

(30) Foreign Application Priority Data

Dec. 3, 1999  (JP) .......................... 11-344162

(51) Int. Cl.⁷ .............................. H04Q 7/00
(52) U.S. Cl. ................ 370/331; 455/436; 455/442
(58) Field of Search ................ 370/331, 332, 370/333, 324, 320, 350, 310.1, 310.2, 342, 328, 335; 455/436, 437, 438, 439, 440, 441, 442

(56) References Cited

U.S. PATENT DOCUMENTS

| | | | |
|---|---|---|---|
| 5,940,371 A | * | 8/1999 | Mitts et al. ................ 370/236 |
| 5,940,381 A | * | 8/1999 | Freeburg et al. ............ 370/331 |
| 5,978,679 A | * | 11/1999 | Agre ........................ 455/442 |
| 6,009,086 A | * | 12/1999 | Freeburg et al. .......... 370/310.2 |
| 6,058,107 A | * | 5/2000 | Love et al. ................ 370/332 |
| 6,125,110 A | * | 9/2000 | Proctor et al. ............. 370/331 |
| 6,128,287 A | * | 10/2000 | Freeburg et al. ............ 370/331 |
| 6,138,020 A | * | 10/2000 | Galyas et al. ............... 455/436 |
| 6,216,004 B1 | * | 4/2001 | Tiedemann et al. ......... 455/442 |
| 6,483,817 B1 | * | 11/2002 | Antonio et al. ............ 370/328 |
| 6,519,456 B2 | * | 2/2003 | Antonio et al. ............ 455/442 |
| 6,570,856 B1 | * | 5/2003 | Freeburg et al. .......... 370/310.1 |

FOREIGN PATENT DOCUMENTS

JP          11-234721          8/1999

* cited by examiner

Primary Examiner—Wellington Chin
Assistant Examiner—Jamal A. Fox
(74) Attorney, Agent, or Firm—Venable LLP; Catherine M. Voorhees

(57) ABSTRACT

This invention provides an improved radio communication system performing a soft hand-off procedure between the first and second base stations for a mobile station and performing asynchronous packet communication between a base station controller and each base station. The first and second base stations assign hand-off exclusive bandwidths to respective communication lines between the base station controller and themselves during the soft hand-off procedure. Accordingly, the first and second base stations can simultaneously receive packet signals sent by the base station controller, and then the mobile station can accurately perform site diversity.

8 Claims, 6 Drawing Sheets

RADIO COMMUNICATION SYSTEM

BACKGROUND OF THE INVENTION

1. Field of the Invention

The present invention generally relates to radio communication systems, and more particularly relates to a code division multiple access (CDMA) radio communication system which performs asynchronous transfer mode (ATM) communications between a base station controller and each base station.

2. Description of the Related Art

In radio communication systems, a hand-off procedure has been performed when a mobile station transfers from a service area of the first base station to an adjacent service area of the second base station. The hand-off procedure is roughly classified into a hard hand-off procedure and a soft hand-off procedure. The hard hand-off procedure is performed such that the mobile station is connected with the second base station as soon as being disconnected with the first base station. Alternatively, the soft hand-off procedure is performed such that the mobile station is always connected with both of or at least one of the first and second base stations during the hand-off transition. Accordingly, the soft hand-off procedure can be performed accurately and smoothly without dropping a call due to discontinuity of radio channels. When performing the soft hand-off procedure, the mobile station is required to comprise a rake receiver to achieve site diversity reception that assigns each radio channel between a mobile station and a plurality of base stations. In addition, in order to perform the site diversity reception, received signals transmitted from base stations via respective radio channels must be received at the same phase and include the same information. The communication quality, i.e. bit-error rate, may be improved by selecting the communication paths with low error-rates or by combining the weighted reliable communication paths.

An asynchronous transmission mode (ATM) communication can be adapted for communication between a base station controller and a base station. It is because that the ATM communication accommodates various communications transmitted/received at different transmission speeds and also allows the change in transmission speed in the middle of the call.

However, if the ATM communication is adapted between the base station controller and the base stations, from the point of view of the efficiency and the cost, it is unrealistic that the channel capacity of communication paths are provided based on the maximum traffic. In general, the channel capacity is determined in accordance with an average traffic and the maximum number of traffic channels. The channel capacity is then efficiently utilized by controlling a bandwidth of the communication paths such that signals to be transmitted are classified into two service categories, e.g.; priority traffic and non-priority traffic. Since packets on the application layer are reassembled from ATM cells on the ATM layer, the delay of packet communications tends to occur in the non-priority traffic in comparison with the priority traffic. Consequently, for example, transmission signals such as transferring data that requires no real-time transmission can be classified into non-priority traffic and transmission signals such as voice communication that requires real-time transmission can be classified into priority traffic.

The base station controller 1 performs a bandwidth-securing manner (PP1) comprised of steps RR2, RR3 and RE2 and RE3 to secure a hand-off exclusive bandwidth for packet communications. In the bandwidth-securing manner (PP1), the base station controller 1 first sends bandwidth-securing requests (RR2 and RR3) to the base stations 3 and 4 respectively. In response to the reception of the bandwidth-securing request (RR2), the bandwidth controller 22 of the base station 3 makes the soft hand-off bandwidth assign equipment 21 secure the hand-off exclusive bandwidth for the mobile station 4. Similarly, in response to the reception of the bandwidth-securing request (RR3), the bandwidth controller 22 of the base station 2 makes the soft hand-off bandwidth assign equipment 21 secure the hand-off exclusive bandwidth for the mobile station 4. The base stations 2 and 3 report a termination of securing the hand-off exclusive bandwidth to the base station controller 1 respectively (RE2 and RE3). Simultaneously, the normal communication bandwidth, which the mobile station 4 has been used to communicate with the base station 2 before the soft hand-off procedure, is canceled and released as a vacant bandwidth for other communication.

When a priority ATM cell corresponding to the priority traffic and a non-priority ATM cell corresponding to the non-priority traffic are requested to transmit at the same time, the priority ATM cell is given priority over the non-priority ATM cell. As a result, if the priority traffic is increasing on the communication path, almost all bandwidths of the communication path are assigned to the priority ATM cells, and the non-priority ATM cells are limited to transmit as to transmission speed and transmission bandwidth.

As mentioned above, to obtain the site diversity effect in the soft hand-off procedure, a plurality of transmission signals transmitted via different communication paths must be received at the same phase and include the same information. For this reason, the two base stations corresponding to the soft hand-off procedure must transmit the transmission signals at the synchronized transmission timing of transmission signals. However, it is difficult to synchronize the transmission timings of the transmission signals when the ATM communication is adapted between the base station controller and each base station. For example, when signals to be provided to two base stations for the hand-off procedure are non-priority traffic, the transmission time between the base station controller and each base station is unfixed since non-priority traffic is limited to transmit according to the amount of priority traffic. Further, since priority of service categories depends upon each base station the ATM cells that are provided to the base stations corresponding to the hand-off procedure are normally received at different timings.

When base stations receives the ATM cells at different timing and transmit radio signals corresponding to the ATM cells to the mobile station without adjusting the reception time difference, the mobile station can not perform the site diversity reception. Accordingly, the communication quality deteriorates during the hand-off procedure, or the hand-off procedure is not performed accurately and smoothly.

SUMMARY OF THE INVENTION

It is therefore an object of the present invention to provide an improved radio communication system which operates a soft hand-off procedure accurately and smoothly when communication between a base station controller and each base station is adapted to asynchronous communication (e.g. ATM communication)

It is another object of the present invention to provide an improved radio communication system having a bandwidth controller to assign a hand-off exclusive bandwidth to communication paths between the base station controller and base stations corresponding to the soft hand-off procedure.

In order to achieve the above object of the present invention, a radio communication system performing a soft hand-off procedure for a mobile station, the radio communication system comprising;

a base station controller for determining a commencement and a termination of the soft hand-off procedure, a first base station for performing asynchronous communication with said base station controller via a first communication line and for assigning a first hand-off exclusive bandwidth to the first communication line bases on the commencement of the soft hand-off procedure, and a second base station for performing asynchronous communication with said base station controller via a second communication line and for assigning a second hand-off exclusive bandwidth, that is approximately equal to the first hand-off exclusive bandwidth, to the second communication line bases on the commencement of the soft hand-off procedure.

BRIEF DESCRIPTION OF THE DRAWINGS

A preferred form of the present invention is illustrated in the accompanying drawings in which.

DETAILED DESCRIPTION OF THE PREFERRED EMBODIMENTS

A. First Embodiment of the Invention

Figure 1:
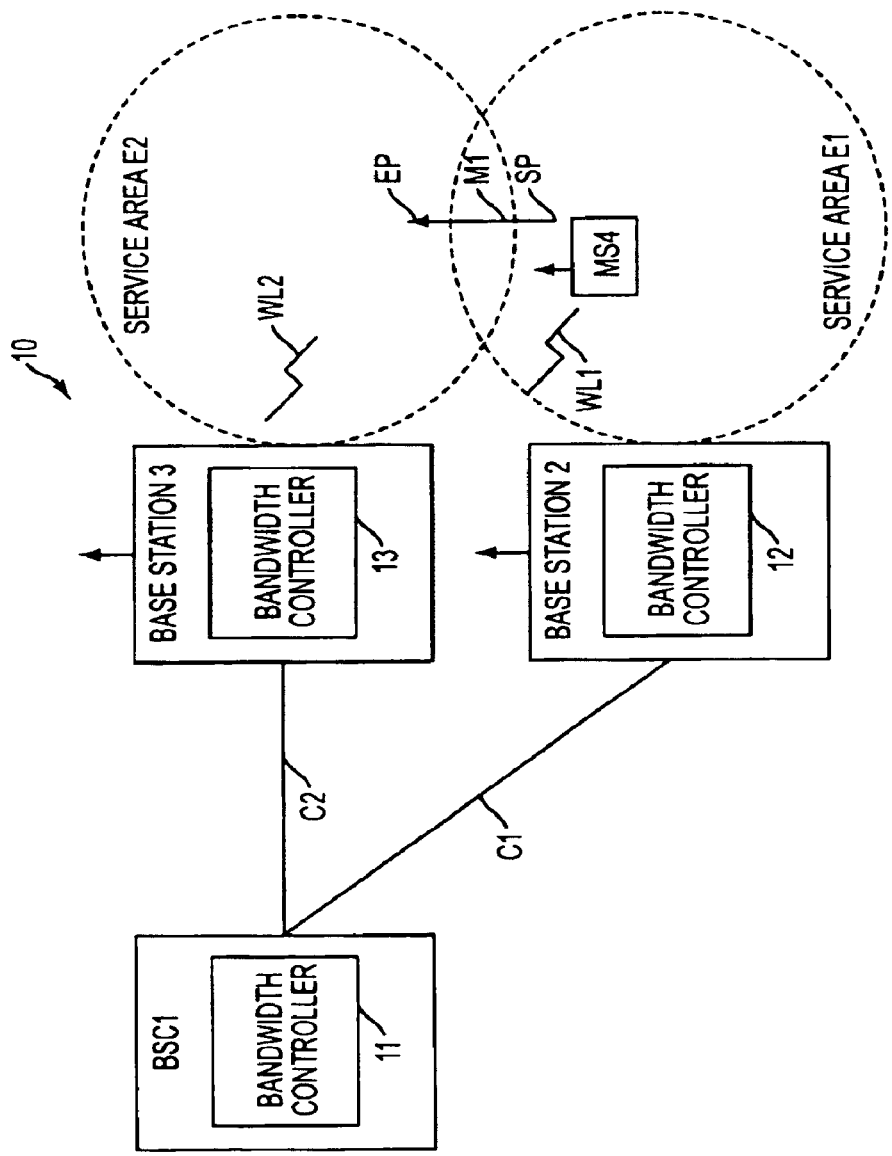
FIG. 1 is a simplified block diagram of a radio communication system in accordance with the first embodiment of the invention.

The first embodiment of the present invention will be described below with reference to a preferred embodiment in conjunction with the accompanying drawings. FIG. 1 shows a simplified block diagram of a radio communication system 10, which is provided with a base station controller 1, base stations 2 and 3, and a mobile station 4.

The base station controller 1 is connected to the base stations 2 and 3 via communication lines C1 and C2 respectively. Here, the communication lines C1 and C2 is satisfied with a predetermined requirements for the asynchronous transfer communication (ATM communication), such as the maximum number of communication channels and the average traffic on the communication channels. Further, a bandwidth of the communication channels is controlled according to service categories divided into priority traffic and non-priority traffic to efficiently utilize the communication lines C1 and C2.

The mobile station 4 is provided with multi-functions that are a normal communication function, a mail transferring function and so on. The normal communication function is classified into the priority traffic, and the mail transferring function is classified into the non-priority traffic.

The base stations 2 and 3 have service areas E1 and E2 and transmit/receive radio signals via radio channels WL1 and WL2 respectively as shown in FIG. 1. The mobile station 4 is transferring from the service area E1 to the service area E2, and a soft hand-off procedure is needed on the way to the service area E2.

The base station controller 1 comprises a bandwidth controller 11, the base station 2 comprises a bandwidth controller 12 and the base station 3 comprises a bandwidth controller 13.

Figure 5:
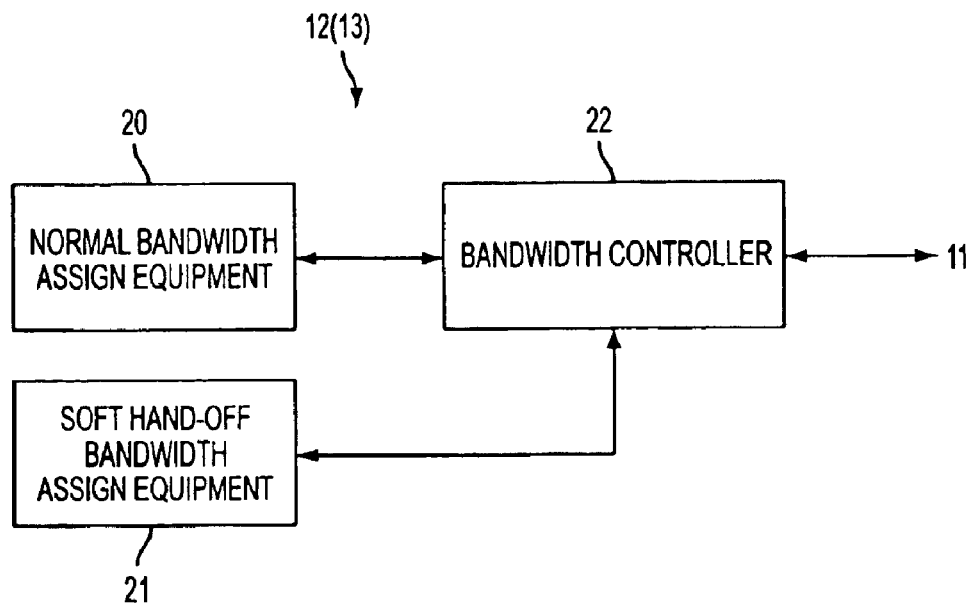
FIG. 5 is a simplified block diagram of a base station in accordance with the first embodiment of the invention.

FIG. 5 shows the bandwidth controllers 12 and 13 of the base stations 2 and 3, which are provided with a normal bandwidth assign equipment 20, a soft hand-off bandwidth assign equipment 21 and a bandwidth controller 22. The normal bandwidth assign equipment 20 assigns a normal communication bandwidth to the communication line C1 when the mobile station 4 communicates with the base stations 2 without soft hand-off procedure. The soft hand-off bandwidth assign equipment 21 controls and assigns a predetermined bandwidth excepting the normal communication bandwidth among the total bandwidth of the communication line C1 as a hand-off exclusive bandwidth. For example, the hand-off exclusive bandwidth can be a minimum service bandwidth (9.6 kbps) in order not to limit the traffic resource between the base station controller 1 and the base station 2. The hand-off exclusive bandwidth is a fixed value (or fixed bandwidth) and is required to be the same value as other hand-off exclusive bandwidth of other base stations (e.g. the base station 3). Consequently, since the base stations 2 and 3 simultaneously receives ATM cells sent by the base station controller 1 and then simultaneously transmits them to the mobile station 4, site diversity can be performed accurately. In addition, in order to perform a plurality of the soft hand-off procedures for different mobile stations at the same time, the soft hand-off bandwidth assign equipment 21 can secure a plurality of the hand-off exclusive bandwidth.

The bandwidth controller 22 is a centralized bandwidth managing apparatus for collectively managing bandwidths in the base station 2. That is, the bandwidth controller 22 causes the normal bandwidth assign equipment 20 to assign a normal bandwidth to the communication line C1 in normal communication and also causes the soft hand-off bandwidth assign equipment 21 to assign the hand-off exclusive bandwidth to the communication line C1 in the soft hand-off procedure. In the normal communication, if the first ATM communication of the priority traffic and the second ATM communication of non-priority traffic are requested at the same time, the normal bandwidth assign equipment 20 give the first ATM communication priority as to assignment of bandwidths of the communication line C1.

The bandwidth controller 13 of the base station 3 also comprises the normal bandwidth assign equipment 20, the soft hand-off bandwidth assign equipment 21 and the bandwidth controller 22 as shown in FIG. 5. Since operations of the bandwidth controller 13 are the same as the bandwidth controller 12, they are omitted here.

Next, the bandwidth controller 11 of the base station controller 1 will be described below with reference to FIG.

Figure 6:
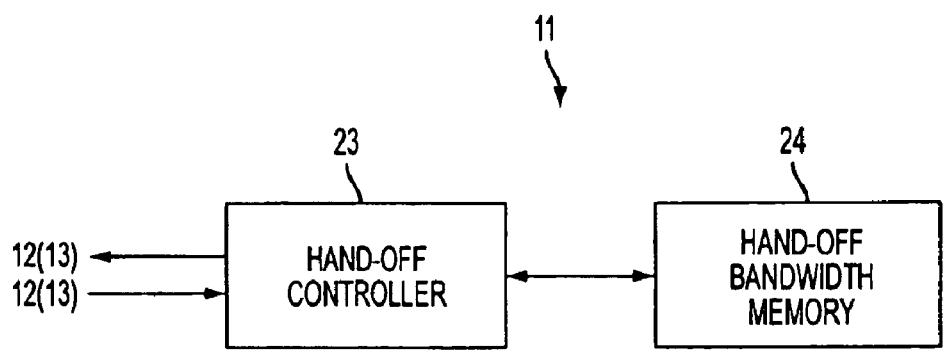
FIG. 6 is a simplified block diagram of a base station controller in accordance with the first embodiment of the invention.

6. In FIG. 6, the base station 1 is provided with a hand-off controller 23 and a hand-off bandwidth memory 24. The hand-off controller 23 decides whether or not a mobile station needs a soft hand-off procedure when the mobile station sends a pilot signal strength message indicating a received power of a pilot signal of the corresponding base station. If performing the hand-off procedure, the hand-off controller 23 negotiates establishment of and release from hand-off exclusive bandwidths of the communication lines C1 and C2 with the bandwidth controllers 12 and 13 of the base stations 2 and 3. The present status of the establishment of and the release from the hand-off exclusive bandwidths is recorded to the hand-off bandwidth memory 24, and then the hand-off controller 23 is always operable to access the hand-off bandwidth memory 24.

Figure 2:
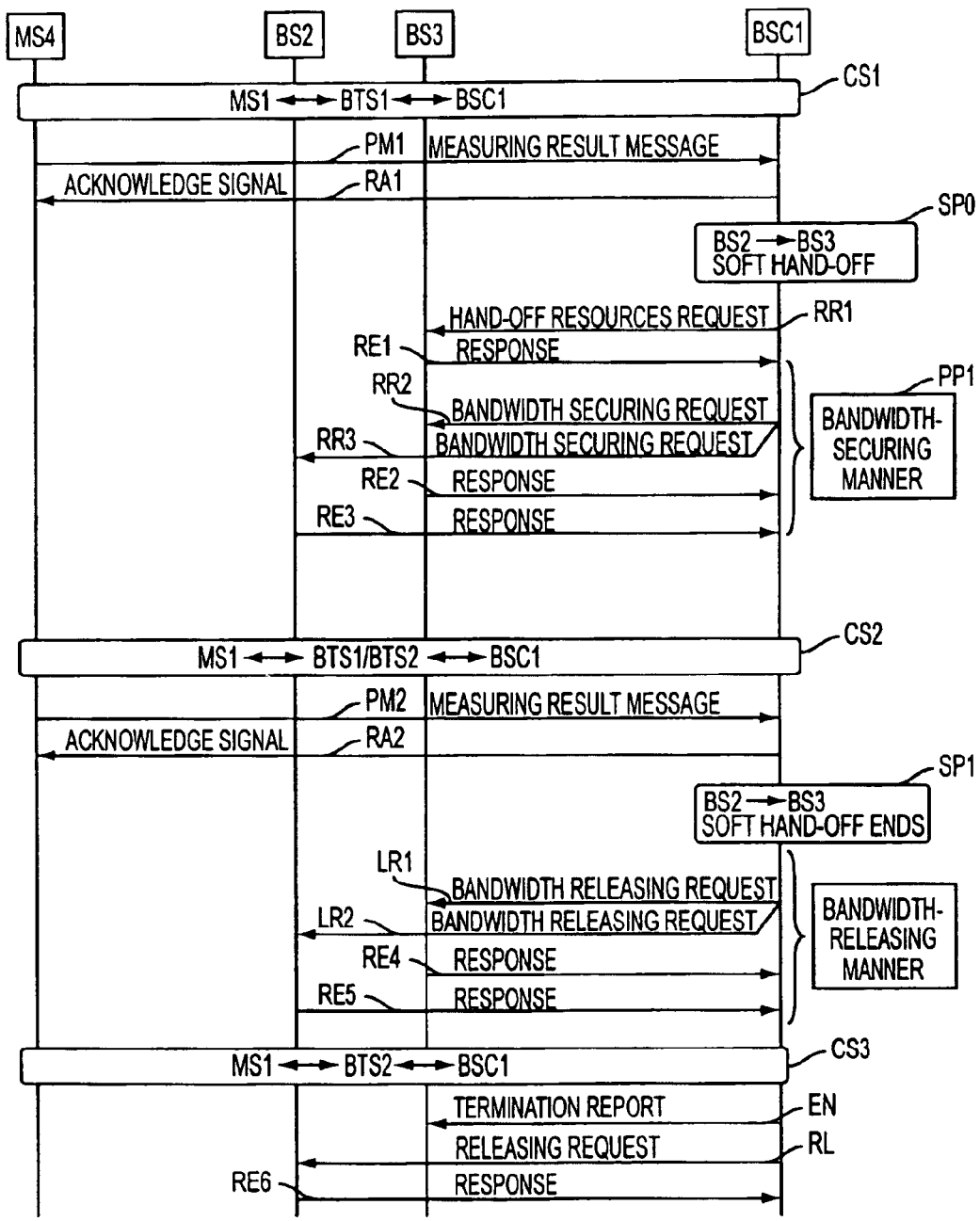
FIG. 2 is a simplified sequence sheet showing a soft-hand-off procedure according to the first embodiment of the invention.

The soft hand-off procedure according to the first embodiment of the invention will be described below. FIG. 2 shows a sequence of the hand-off procedure, which is performed among the base station controller 1, the base stations 2 and 3 and mobile station 4. Here, assuming that the mobile station 4 is receiving mail data by performing the above-mentioned mail transferring function classified into the non-priority traffic and is also moving from the service area E1 of the base station 2 to the service area E2 of the base station 3 as shown in FIG. 1. That is, the mobile station 4 is moving along an arrow M1 shown in FIG. 1. In FIG. 1, when mobile station 4 is located near the beginning of the arrow M1, the mobile station 4 communicates with the base station 2 via a radio channel WL1.

The base station 2 communicates with the base station controller 1 by transmitting/receiving ATM cells via the communication line C1, and then the bandwidth controller 20 of the base station 2 assigns, to the communication line C1, a normal communication bandwidth corresponding to the mail transferring function. From the point of view on the ATM layer, information composing of the mail data in the mail transferring function is assigned to a payload of an ATM cell, and the ATM cell is transferred from the base station controller 1 to the base station 2. In other words, from the point of view of the application layer, the information is assigned to a packet, and the packet is transferred from the base station controller 1 to the base station 2 to the communication line C1. Furthermore, the information assigned to the ATM cell is converted to a radio frame and is then transmitted from the base station 2 to the mobile station 4. These operations correspond to a communication status CS1 shown in FIG. 2.

In the communication status CS1, the mobile station 4 periodically measures a received power of the pilot signal sent via the radio channel WL1 and reports the result of the received power to the base station controller 1 through the base station 2 as a measuring result message PM1. The base station controller 1 thus sends an acknowledge signal RA1 to the mobile station 4 in response to the reception of the measuring result message PM1. Alternatively, the mobile station 4 can send the message PM1 only when the received power is lower than the predetermined threshold.

The hand-off controller 23 of the base station controller 1 decides whether or not the hand-off procedure is necessary for the mobile station 4. If the hand-off procedure is necessary, the hand-off controller 23 finds and nominates at least one base station having the optimum conditions among lots of adjacent base stations. For example, if decreasing the received power of radio signals sent by the base station 2 and increasing the received power of radio signals sent by the base station 3 compared with other adjacent base stations, the hand-off controller 23 can find the base station 3 as the most suitable base station. Consequently, by receiving and investigating the measuring result message PM1, the base station controller 1 can understand the necessity of the hand-off procedure and the tracks of the mobile station 4 as indicated by the arrow M2 shown in FIG. 1.

When the mobile station 4 approaches near the boundary between service areas E1 and E2, the hand-off controller 23 of the base station controller 1 decides to perform the soft-handoff procedure based on the measuring result message PM1 (SP0). Here, the service areas E1 and E2 geographically overlap around the boundary. When the soft hand-off procedure is started, the base station controller 1 requests the base station 3 to provide communication resources for the soft hand-off procedure to the mobile station 4 (RR1). The base station 3 sends a response to the base station controller 1 (RE1). Accordingly, the communication between the base station controller 1 and the base station 3 is performed via the communication line C2 in accordance with the ATM communication procedure.

The base station controller 1 performs a bandwidth-securing manner (PP1) comprised of steps RR2, RR3, RE2 and RE3 to secure a hand-off exclusive bandwidth for packet communications. In the bandwidth-securing manner (PP1), the base station controller 1 first sends bandwidth-securing requests (RR2 and RR3) to the base stations 3 and 4 respectively. In response to the reception the bandwidth-securing request (RR2), the bandwidth controller 22 of the base station 3 makes the soft hand-off bandwidth assign equipment 21 secure the hand-off exclusive bandwidth for the mobile station 4. Similarly, in response to the reception the bandwidth-securing request (RR2), the bandwidth controller 22 of the base station 2 makes the soft hand-off bandwidth assign equipment 21 secure the hand-off exclusive bandwidth for the mobile station 4. The base stations 2 and 3 report a termination of securing the hand-off exclusive bandwidth to the base station controller 1 respectively (RE2 and RE3). Simultaneously, the normal communication bandwidth, which the mobile station 4 has been used to communicate with the base station 2 before the soft hand-off procedure, is canceled and released as a vacant bandwidth for other communication.

Since the hand-off exclusive bandwidths assigned to the base stations 2 and 3 are identical, if the ATM cells are simultaneously transmitted to the base stations 2 and 3, the ATM cells can be simultaneously received at the base station 2 and 3 without regard to difference in the traffic or the vacant bandwidth for normal communications. Further, the base stations 2 and 3 can send radio signals corresponding to the ATM cells to the mobile station 4 at synchronized transmission timing (CS2). Consequently, the mobile station 4 can perform site diversity by combining the radio signals sent from both the base stations 2 and 3 and then accurately receive the above mentioned mail data.

The mobile station 4 measures received powers of the pilot signals sent via the radio channels WL1 and WL2 and reports the measuring results to the base station controller 1 through the base station 2 as a measuring result message PM2. In response to the reception of the measuring result message PM2, the base station controller 1 recognize that the mobile station 4 completely enter the service area E1 (the end EP of the arrow M1 as shown in FIG. 1) based on the received power of the pilot signal of the base station 3. The base station controller 1 thus sends an acknowledge signal to the mobile station 4 (RA2) and makes the base station 2 stop to transmit the radio signal to the mobile station 4 (SP1). That is, the mobile station 4 continues to communicate with the only base station 3.

Next, the base station controller 1 performs a bandwidth-releasing manner (PP2) comprised of steps LR1, LR2 RE4 and RE5 to release the hand-off exclusive bandwidth. In the bandwidth-releasing manner (PP2), the base station controller 1 first sends a bandwidth-releasing request to the base stations 3 (LR1) and second sends a bandwidth-releasing request to the base station 2 (LR2). In response to the reception the bandwidth-releasing request (LR1), the base station 3 sends an acknowledge signal to the base station controller 1 (RE4). Similarly, in response to the reception the bandwidth-releasing request (LR2), the base station 2 sends an acknowledge signal to the base station controller 1 (RE5).

After sending the acknowledge signal, the base station 3 assigns a normal communication bandwidth to communication line C2 for the mobile station 4, and then the mobile station 4 will be communicating with the base station controller 1 by using the normal communication bandwidth on the communication line C2 (CS3) In order to continue the communication between the base station 3 and the mobile station 4, the release from the hand-off exclusive bandwidth in the communication line C2 must be performed after assigning the normal communication bandwidth thereto. In the communication status (CS3), the information composing of the mail data in the mail transferring function is assigned to a payload of an ATM cell, and the ATM cell is transferred from the base station controller 1 to the base station 2. Further, the information assigned to the ATM cell is converted to a radio frame and is then transmitted from the base station 2 to the mobile station 4 via the radio channel WL2.

Next, when the hand-off controller 23 of the base station controller 1 reports the termination of the hand-off procedure to the bandwidth controller 22 of the base station 3 (EN), the bandwidth controller 22 makes the soft hand-off bandwidth assign equipment 21 release the hand-off exclusive bandwidth. As a result, the hand-off exclusive bandwidth becomes a vacant bandwidth until other hand-off procedure is performed. Similarly, when the hand-off controller 23 of the base station controller 1 sends a resource-releasing request the bandwidth controller 22 of the base station 2 (RL), the bandwidth controller 22 makes the soft hand-off bandwidth assign equipment 21 release the hand-off exclusive bandwidth. As a result, the hand-off exclusive bandwidth becomes a vacant bandwidth until other hand-off procedure is performed. The base station 2 sends a response to the base station controller 1 to report the termination of releasing the hand-off exclusive bandwidth (RE6).

According to the first embodiment of the invention, the mobile station 4 can securely perform site diversity during the soft hand-off procedure since the base stations 2 and 3 simultaneously receives ATM cells from the base station controller 1 without regard to the service categories of the ATM cells and the traffic on the communication lines C1 and C2.

Further, according to the first embodiment of the invention, it is unnecessary to adjust the transferring timings of the ATM cells in each base station by buffer memories.

B. Second Embodiment of the Invention

Figure 3:
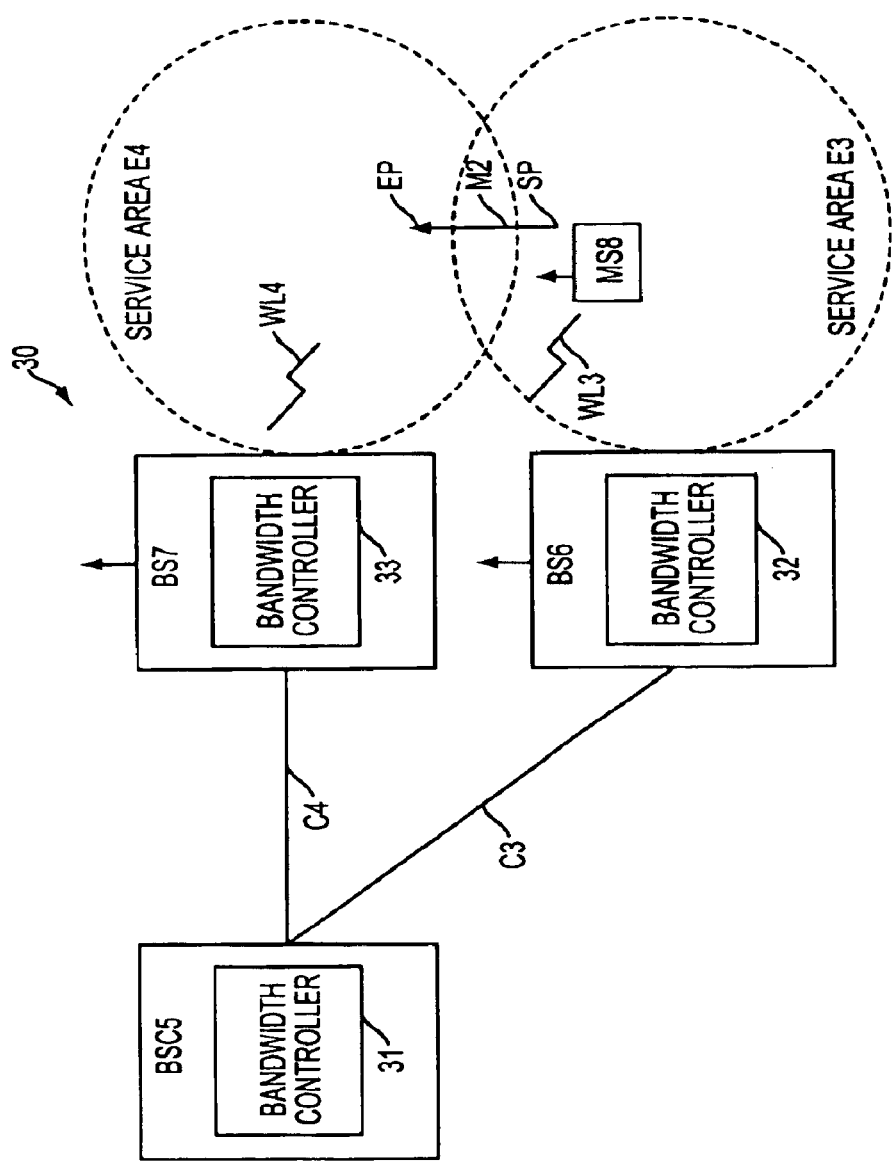
FIG. 3 is a simplified block diagram of a radio communication system in accordance with the second embodiment of the invention.

FIG. 3 shows a radio communication system in accordance with the second embodiment of the invention. In FIG. 3, the radio communication system 30 comprises a base station controller 5, a base station 6 connected with the base station controller 5 via a communication line C3, a base station 7 connected with the base station controller 5 via the communication line C4 and a mobile station 8. The base stations 6 and 7 have service areas E3 and E4, which are geographically overlapped each other.

Here, assuming that the mobile station 8 moves from the service area E3 to the service area E4 along an arrow M2 shown in FIG. 3. In addition, a soft hand-off procedure is performed when the mobile station 8 approaches around the overlapped area between the service areas E3 and E4.

The communication procedures of the radio communication system 30 in accordance with the second embodiment are basically the same as that of the first embodiment. For this reason, the different procedures will be explained below.

Substantial difference between the first and second embodiments is to adaptively determine a hand-off exclusive bandwidth in consideration with both of open-bandwidths of the base stations 6 and 7. That is, in the first embodiment a hand-off exclusive bandwidth is assigned at a predetermined fixed value, but in the second embodiment a hand-off exclusive bandwidth is changed according to the traffic of the base stations 6 and 7.

Figure 7:
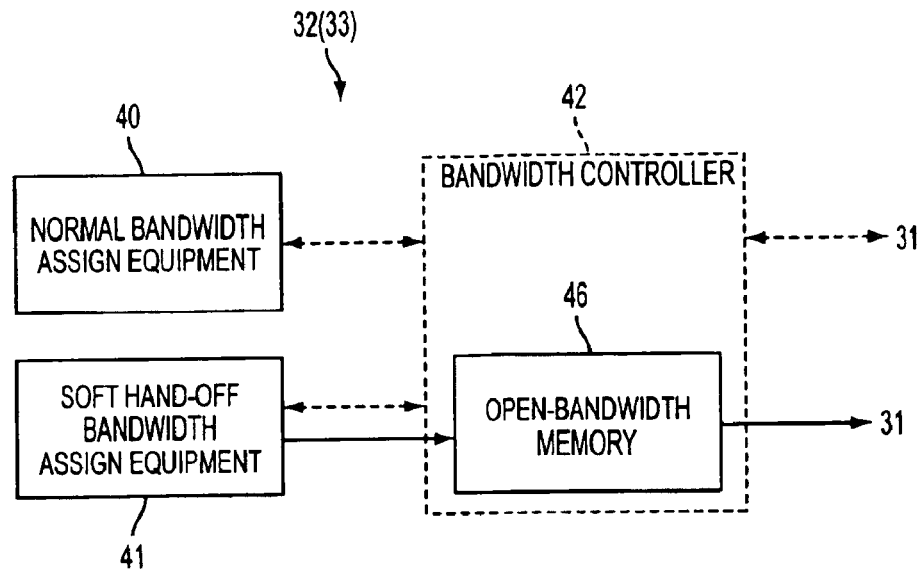
FIG. 7 is a simplified block diagram of a base station in accordance with the second embodiment of the invention.

FIG. 7 shows internal structure of the bandwidth controllers 32 and 33, each comprising a normal bandwidth assign equipment 40, a soft hand-off bandwidth assign equipment 41, a bandwidth controller 42 and an open-bandwidth memory 46. The normal bandwidth assign equipment 40 has the same function as the normal bandwidth assign equipment 20 mentioned in the first embodiment, that is, assigning a normal communication bandwidth to the communication line C3 when the mobile station 4 communicates with the base stations 6 without soft hand-off procedure. The soft hand-off bandwidth assign equipment 41 also has the same function as the soft hand-off bandwidth assign equipment 21 mentioned in the first embodiment and is connected with the open-bandwidth memory 46

The bandwidth controller 42 is capable of handling the normal bandwidth assign equipment 40 to adjust a hand-off exclusive bandwidth according to an instruction of the bandwidth controller 31 of the base station controller 5 when performing a soft hand-off procedure. Accordingly, It is possible for the bandwidth controller 42 to assign a flexible hand-off exclusive bandwidth in response to each of soft hand-off procedures. The open-bandwidth memory 46 detects and stores the total amount of open-bandwidth that is not assigned for soft hand-off procedures.

In this embodiment, a hand-off exclusive bandwidth prepared for each base station is not needed to be identical to any others since the base station controller 5 adaptively determines a hand-off exclusive bandwidth for each soft hand-off procedure such that both of the base stations 6 and 7 have the same hand-off exclusive bandwidth.

Figure 8:
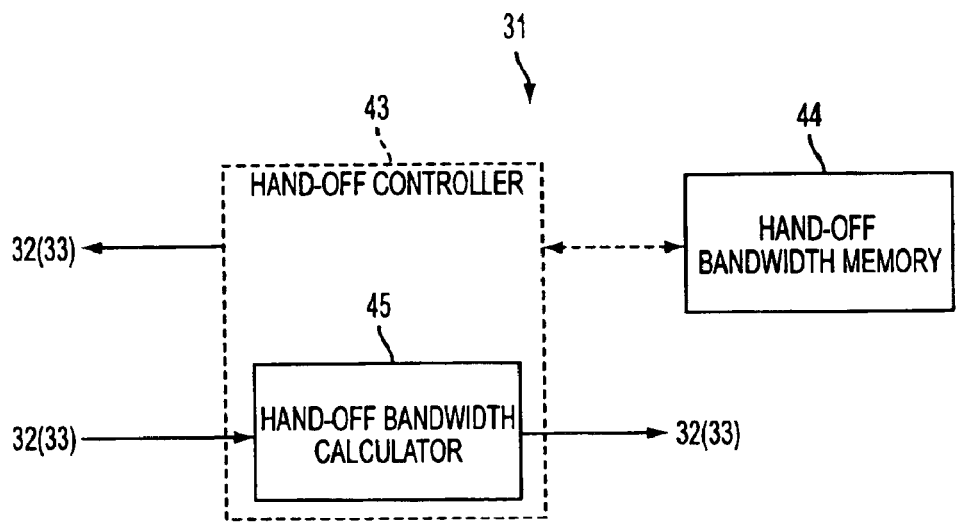
FIG. 8 is a simplified block diagram of a base station controller in accordance with the second embodiment of the invention.

FIG. 8 shows internal structure of the bandwidth controller 31, which comprises a hand-off controller 43 and a hand-off bandwidth memory 44. The hand-off controller 43 further comprises a hand-off bandwidth calculator 45 and is connected to the hand-off bandwidth memory 44. The hand-off bandwidth calculator 45 determines a hand-off exclusive bandwidth based on reports indicating open-bandwidths in the predetermined hand-off exclusive bandwidths of the base stations 6 and 7. That is, the base stations 6 and 7 report the open-bandwidths X and Y respectively, and the open-bandwidth X is narrower than the open-bandwidth Y (X<Y), the hand-off bandwidth calculator 45 selects the open-bandwidth X as a hand-off exclusive bandwidth common to the base stations 6 and 7. The open-bandwidth X is used as the common hand-off exclusive bandwidth to match the receiving timings of ATM cells transferred via different communication lines C3 and C4 and to reduce the transmission delay of the ATM cells.

However, if the bandwidth X is broader than a bandwidth TV1 corresponding to the maximum traffic on one radio channel, the bandwidth TV1 can be assigned to the hand-off exclusive bandwidth in order to spare a remaining open-bandwidth for other soft-hand-off procedures. Furthermore, a bandwidth TV2 narrower than bandwidth TV1 can be assigned to the hand-off exclusive bandwidth. In this case, it is possible to match the transmission timings of the signals for the mobile station 8.

Figure 4:
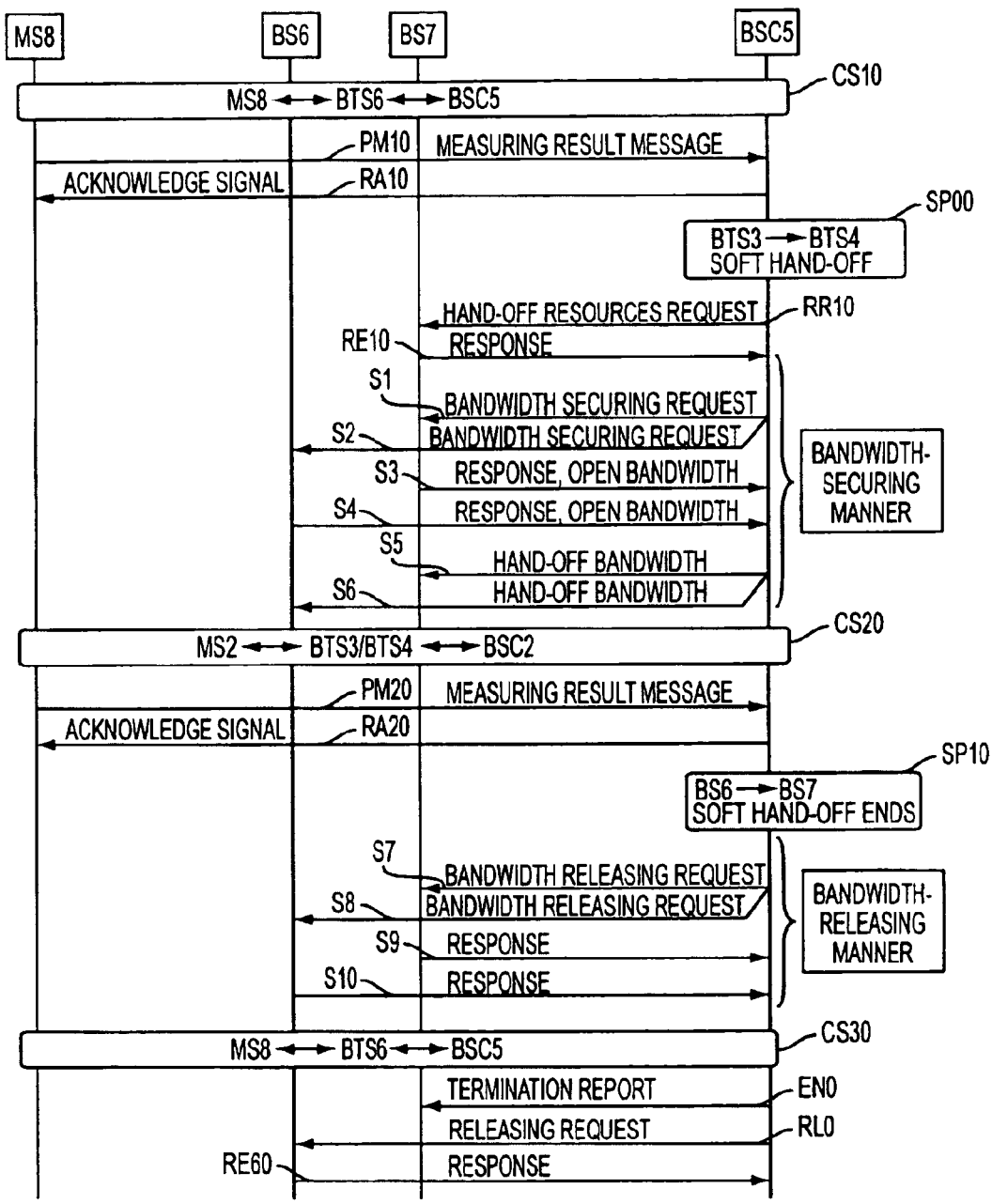
FIG. 4 is a simplified sequence sheet showing a soft-hand-off procedure according to the second embodiment of the invention.

Next, a communication procedure among the base station controller 2, the base stations 6 and 7, and mobile station 8 will be described with reference to FIG. 4.

In a communication status (CS10), the mobile station 8 communicates with the base station controller 5 via the base station 6. The base station controller 5 send ATM cells to the base station 6 by using a normal communication bandwidth assigned to the communication line C3. The base station 6 send radio signals corresponding to the ATM cells to the mobile station 8 via the radio channel WL3. The mobile station 8 periodically measures a received power of pilot signal sent by the base station 6 and reports the result of the received power to the base station controller 5 through the base station 6 as a measuring result message (PM10). The base station controller 5 thus sends an acknowledge signal to the mobile station 8 in response to the reception of the measuring result message (RA10). In this case, it is possible to send the measuring result message to the base station controller 2 only when the mobile station 8 detects that the received power of the base station 6 is less than the predetermined threshold.

The hand-off controller 43 of the base station controller 5 decides whether or not a hand-off procedure for the mobile station 8 is needed. If the hand-off procedure is needed, the hand-off controller 43 finds one base station having the optimum conditions for the communication with the mobile station 8 (in this embodiment, it is the base station 7). For example, the mobile station 8 measures received powers of the pilot signals transmitted from the adjacent base stations.

When the mobile station 8 approaches a boundary between service areas E1 and E2 (namely, the middle of the arrow M2 shown in FIG. 3), the hand-off controller 43 of the base station 5 decides to perform the soft-handoff procedure between the base stations 6 and 7 (SP00). The base station controller 5 sends a hand-off request signal to the base station 7 in order to secure hand-off resources necessary for the soft-handoff Procedure (RR10). The base station 7 sends a response to the base station controller 5 in response to the hand-off request signal (RE10). The communication between the base station controller 5 and the base station controller 7 is performed via the communication line C3 in accordance with the ATM communication procedure.

Next, a bandwidth-securing manner (AD1) comprising steps S1 to S6 will be explained below. The base station controller 5 sends a bandwidth-securing request to the base stations 7 in order to secure hand-off exclusive bandwidths for the ATM communication (S1). Similarly, the base station controller 5 sends a bandwidth-securing request to the base stations 6 (S2). In response to the reception the bandwidth-securing request, the base station 7 checks an open-bandwidth possible to be assigned to the communication line C3, i.e. a bandwidth X, and sends a response including open-bandwidth information to the base station controller 5 (S3). The base station 6 also checks an open-bandwidth possible to be assigned to the communication line C4, i.e. a bandwidth Y, and sends a response including open-bandwidth information to the base station controller 5 (S4). Based on the open-bandwidth information, the base station controller 5 (hand-off bandwidth calculator 45) determines a hand-off exclusive bandwidth. In this embodiment, if the bandwidth X is narrower than the bandwidth Y, the bandwidth X is determined to the hand-off exclusive bandwidth. The base station controller 5 informs the base stations 6 and 7 of the bandwidth X as a common hand-off exclusive bandwidth (S5 and S6).

By using the common hand-off exclusive bandwidth, the base stations 6 and 7 can simultaneously receive the ATM cells sent by the base station controller 5. Consequently the mobile station 8 can accurately perform site diversity (CS20). The mobile station 8 measures received powers of the pilot signals sent via the radio channels WL3 and WL4, and reports the results of the measurements to the base station controller 5 through the base station 7 as a measuring result message (PM20). In response to the reception of the measuring result message, the base station controller 5 sends an acknowledge signal to the mobile station 8 (RA20). Based on the received power of the pilot signal of the base station 7, the base station controller 5 recognizes that the mobile station 8 completely enters the service area E4 (the end EP of the arrow M2 as shown in FIG. 3). If the received power of the base station 7 exceeds a predetermined threshold level, the base station controller 1 thus makes the base station 6 stop to transmit the radio signal to the mobile station 4 (SP10). That is, the mobile station 8 continues to communicate with the only base station 7.

Next, the base station controller 5 performs a bandwidth-releasing manner (AD2) comprising steps S7 to S10 to release the hand-off exclusive bandwidth. In the bandwidth-releasing manner (AD2), the base station controller 5 first sends a bandwidth-releasing request to the base station 7 (S7) and second sends a bandwidth-releasing request to the base station 6 (S8). In response to the reception of the bandwidth-releasing request, the base station 7 makes the soft hand-off bandwidth assign equipment 41 release the hand-off exclusive bandwidth for the mobile station 8. Similarly, in response to the reception of the bandwidth-releasing request, the base station 6 makes the soft hand-off bandwidth assign equipment 41 release the hand-off exclusive bandwidth for the mobile station 4. The base stations 2 and 3 thus report a termination of releasing the hand-off exclusive bandwidth to the base station controller 5 (S9 and S10).

After the base station 6 reports the termination of releasing the hand-off exclusive bandwidth, a vacant normal bandwidth is assigned to the mobile station 8. In order to continue to communicate between the mobile station 8 and the base station 6 without dropping the communication, the hand-off exclusive bandwidth must be released after assigning the vacant normal bandwidth to the mobile station 8. Consequently, as similar to the communication status (CS10) mentioned above, the information composing of the mail in the mail transferring function is assigned to a payload of an ATM cell, and the ATM cell is transferred from the base station controller 5 to the base station 7. Furthermore, the information assigned to the ATM cell is converted to a radio frame and is then transmitted from the base station 7 to the mobile station 8 via the radio channel WL4 (CS30).

Next, the hand-off controller 31 of the base station controller 5 reports the termination of the hand-off procedure to the bandwidth controller 32 of the base station 6 (EN0), the bandwidth controller 32 makes the soft hand-off bandwidth assign equipment 41 release the hand-off exclusive bandwidth. As a result, the hand-off exclusive bandwidth becomes a vacant bandwidth until other hand-off procedure is performed. Similarly, when the hand-off controller 43 of the base station controller 5 sends a resource-releasing request the bandwidth controller 32 of the base station 6 (RL), the bandwidth controller 32 makes the soft hand-off bandwidth assign equipment 41 release the hand-off exclusive bandwidth. As a result, the hand-off exclusive bandwidth becomes a vacant bandwidth until other hand-off procedure is performed. The released hand-off exclusive bandwidth is stored to the open-bandwidth memory 46 as an open-bandwidth. The response RE60 is send back to the base station controller 5 to report the termination of releasing the hand-off exclusive bandwidth.

According to the second embodiment of the invention, even if transmitting ATM cells classified into non-priority traffic to the mobile station 8, the soft hand-off procedure can be securely performed since the base station controller 1 controls the transmission timing of the ATM cells transmitted via different communication lines. In addition, the hand-off exclusive bandwidth can be adaptively determined based on the maximum open-bandwidth between the base stations 6 and 7.

C. Other Embodiments

The invention can be adapted to other radio communication systems that is required to perform a soft handoff procedure without regard to types of asynchronous communication methods (e.g. AMT communications, packet communications) between the base station controller and the each base station.

Although the communication lines C1 to C4 have been described as wired lines in the first and second embodiments, the communication line C1 to C4 between the base station controller and each base station can be replaced to radio communication paths.

The first and second embodiments have been described to adapt to down-link communication paths from the base station controller to the mobile station, however, it is possible to adapt to up-link communication path in an opposite direction on the down-link communication paths by using the hand-off exclusive bandwidth assignment technique mentioned above. Accordingly, the invention can be widely adapted to radio communication systems that perform the first asynchronous communication between the base station controller and the first base station and the second asynchronous communication between the base station controller and the second base station.

What is claimed is:

1. A radio communication system performing a soft hand-off procedure for a mobile station, the radio communication system, comprising:
    a base station controller for determining a commencement and a termination of the soft hand-off procedure,
    a first base station for performing asynchronous communication with said base station controller via a first communication line and for assigning a first hand-off exclusive bandwidth to the first communication line bases on the commencement of the soft hand-off procedure, and
    a second base station for performing asynchronous communication with said base station controller via a second communication line and for assigning a second hand-off exclusive bandwidth, that is approximately equal to the first hand-off exclusive bandwidth, to the second communication line bases on the commencement of the soft hand-off procedure,
    wherein said the first base station comprising:
        a soft hand-off bandwidth assign equipment for assigning the first hand-off exclusive bandwidth to the first communication line,
        a normal bandwidth assign equipment for assigning a normal communication bandwidth to the first communication line, and
        a bandwidth controller for activating said soft hand-off bandwidth during the soft hand-off procedures based on the commencement and a termination of the soft hand-off procedure, and
    wherein the second base station comprising:
        a soft hand-off bandwidth assign equipment for assigning the second hand-off exclusive bandwidth to the second communication line,
        a normal bandwidth assign equipment for assigning a normal communication bandwidth to the second communication line, and
        a bandwidth controller for activating said soft hand-off bandwidth during the soft hand-off procedures based on the commencement and a termination of the soft hand-off procedure.

2. A radio communication system performing a soft hand-off procedure for a mobile station, the radio communication system comprising:
    a base station controller for determining a commencement and a termination of the soft hand-off procedure,
    a first base station for performing asynchronous communication with said base station controller via a first communication line and for assigning a first hand-off exclusive bandwidth to the first communication line bases on the commencement of the soft hand-off procedure, and
    a second base station for performing asynchronous communication with said base station controller via a second communication line and for assigning a second hand-off exclusive bandwidth, that is approximately equal to the first hand-off exclusive bandwidth, to the second communication line bases on the commencement of the soft hand-off procedure.
    wherein said first base station releases the first hand-off exclusive bandwidth from the first communication line and stops transmitting to the mobile station in response to the termination of the soft hand-off procedure, and
    said second base station releases the second hand-off exclusive bandwidth from the second communication line and assigns a normal communication bandwidth to the second communication line in response to the termination of the soft hand-off procedure.

3. A radio communication system performing a soft hand-off procedure for a mobile station, the radio communication system comprising;
    a base station controller for determining a commencement and a termination of the soft hand-off procedure,
    a first base station for performing asynchronous communication with said base station controller via a first communication line, for notifying a first open-bandwidth of the first communication line to said base station controller, which is possible to be assigned for the soft hand-off procedure, and for assigning a common hand-off exclusive bandwidth to the first communication line in response to the commencement of the soft hand-off procedure, and
    a second base station for performing asynchronous communication with said base station controller via a second communication line, for notifying a second open-bandwidth of the second communication line to said base station controller, which is possible to be assigned for the soft hand-off procedure and for assigning the common hand-off exclusive bandwidth to the second communication line in response to the commencement of the soft hand-off procedure,
    wherein said base station controller determines the common hand-off exclusive bandwidth by selecting a smaller bandwidth between the first open-bandwidth and the second open-bandwidth based.

4. A radio communication system according to claim 3, wherein said the first base station comprising:
an open-bandwidth memory for storing the first open-bandwidth corresponding to the first communication line,
a soft hand-off bandwidth assign equipment for notifying the first open-bandwidth to the base station controller and for assigning the common hand-off exclusive bandwidth to the first communication line,
a normal bandwidth assign equipment for assigning a normal communication bandwidth to the first communication line, and
a bandwidth controller for activating said soft hand-off bandwidth during the soft hand-off procedures in response to the commencement and the termination of the soft hand-off procedure,
and wherein said the second base station comprising:
an open-bandwidth memory for storing second open-bandwidth corresponding to the second communication line,
a soft hand-off bandwidth assign equipment for notifying the second open-bandwidth to the base station controller and for assigning the common hand-off exclusive bandwidth to the second communication line,
a normal bandwidth assign equipment for assigning a normal communication bandwidth to the second communication line, and
a bandwidth controller for activating said soft hand-off bandwidth during the soft hand-off procedures in response to the commencement and the termination of the soft hand-off procedure.

5. A radio communication according to claim 3, wherein when the first open-bandwidth and the second open-bandwidth exceeds a maximum bandwidth of a radio channel assigned to each of the first and second base stations, the base station controller selects the maximum bandwidth as the common hand-off exclusive bandwidth.

6. A soft hand-off method in a radio communication system comprising a base station controller which communicates with each of a first base station and a second base station by performing asynchronous communication, the method comprising the steps of;
assigning a normal communication bandwidth to a first communication line between the base station controller and the first base station for normal communication between the base station controller and the mobile station,
determining a commencement of the soft hand-off procedure between the first base station and the second base station,
assigning a first hand-off exclusive bandwidth to the first communication line,
assigning a second hand-off exclusive bandwidth, which is approximately equal to the first hand-off exclusive bandwidth, to a second communication line between the base station controller and the second base station,
simultaneously transmitting packet signals from the base station controller to each of the first and second base stations via the first and second communication lines respectively, determining a termination of the soft hand-off procedure,
releasing the first hand-off exclusive bandwidth from the first communication line,
assigning a normal communication bandwidth to the second communication line, and
releasing the second hand-off exclusive bandwidth from the second communication line,
wherein, the base station controller communicates with the second base station via the second communication line to which the normal communication bandwidth is assigned, and the first base station stops transmit to the mobile station.

7. A soft hand-off method in a radio communication system comprising a base station controller which communicates with each of a first base station and a second base station by performing asynchronous packet communication, the method comprising the steps of;
assigning a normal communication bandwidth to a first communication line between the base station controller and the first base station for normal communication between the base station controller and a mobile station,
determining a commencement of the soft hand-off procedure between the first base station and the second base station,
notifying a first open-bandwidth that is possible to be assigned to the first communication line for the soft hand-off procedure,
notifying a second open-bandwidth that is possible to be assigned to a second communication line between the base station controller and the first base station for the soft hand-off procedure,
comparing the first open-bandwidth of the first communication line with the second open-bandwidth of the second communication line,
selecting a smaller bandwidth between the first open-bandwidth and the second open-bandwidth,
transmitting packet signals from the base station controller to the first base station via the first communication line to which the common hand-off exclusive bandwidth is assigned, and
transmitting packet signals from the base station controller to the second base station via the second communication line to which the common hand-off exclusive bandwidth is assigned.

8. A soft hand-off method according to claim 7, the method further comprising the steps of;
determining a termination of the soft hand-off procedure; releasing the common hand-off exclusive bandwidth from the first communication line,
assigning a normal communication bandwidth to the second communication line, and
releasing the common hand-off exclusive bandwidth from the second communication line,
wherein, the base station controller communicate with the second base station via the second communication line to which the normal communication bandwidth is assigned and the first base station stops transmitting to the mobile station.

* * * * *